(12) United States Patent
Umemoto et al.

(10) Patent No.: US 6,882,474 B2
(45) Date of Patent: Apr. 19, 2005

(54) OPTICAL PATH CHANGING POLARIZER

(75) Inventors: Seiji Umemoto, Osaka (JP); Toshihiko Ariyoshi, Osaka (JP); Takao Suzuki, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/756,792

(22) Filed: Jan. 10, 2001

(65) Prior Publication Data

US 2001/0009474 A1 Jul. 26, 2001

(30) Foreign Application Priority Data

Jan. 13, 2000 (JP) .......................... 2000-004242
Jun. 5, 2000 (JP) .......................... 2000-167162

(51) Int. Cl.$^7$ .......................... G02B 27/28; G02B 5/30
(52) U.S. Cl. .................. 359/487; 359/483; 349/62; 362/31
(58) Field of Search ................. 359/483, 485, 359/487; 349/62, 65, 64, 67; 362/19, 31

(56) References Cited

U.S. PATENT DOCUMENTS

| | | | |
|---|---|---|---|
| 5,183,597 A | | 2/1993 | Lu |
| 5,341,231 A | * | 8/1994 | Yamamoto et al. ........... 359/49 |
| 5,390,276 A | | 2/1995 | Tai et al. |

(Continued)

FOREIGN PATENT DOCUMENTS

| | | | |
|---|---|---|---|
| EP | 0 867 747 A2 | 9/1998 | |
| JP | 5-158033 | 6/1993 | ......... G02F/1/1335 |
| JP | 09/297222 | 11/1997 | |
| JP | 10/106328 | 4/1998 | |
| JP | 11-142618 | 5/1999 | |
| JP | 2000-147499 | 5/2000 | |
| WO | WO 97/01610 | 1/1997 | |
| WO | WO 97/30373 | 8/1997 | |
| WO | WO 97/47467 | 12/1997 | |

*Primary Examiner*—Mark A. Robinson
*Assistant Examiner*—Alessandro Amari
(74) *Attorney, Agent, or Firm*—Sughrue Mion, PLLC

(57) ABSTRACT

An optical path changing polarizer has a polarizer including a polarizing element and a transparent protective layer disposed on at least one side of the polarizing element, an adhesive layer disposed on one side surface of the polarizer, and a repetitive prismatic structure disposed on the other side of the polarizer. The repetitive prismatic structure includes optical path changing slopes aligned in a substantially constant direction so as to be inclined at an inclination angle of from 35 to 48 degrees with respect to a plane of the polarizer. Each of respective refractive indexes of the adhesive layer and a material for forming the optical path changing slopes is not lower than a refractive index of the polarizing element or the transparent protective layer. The adhesive layer has a refractive index different by 0.1 or less from a refractive index of a surface layer of the one side of the polarizer.

29 Claims, 4 Drawing Sheets

U.S. PATENT DOCUMENTS

| | | |
|---|---|---|
| 5,485,291 A | 1/1996 | Qiao et al. |
| 5,584,556 A | 12/1996 | Yokoyama et al. |
| 5,598,281 A | 1/1997 | Zimmerman et al. |
| 5,671,994 A | 9/1997 | Tai et al. |
| 5,712,694 A * | 1/1998 | Taira et al. .................... 349/9 |
| 5,727,107 A | 3/1998 | Umemoto et al. .......... 385/116 |
| 5,808,713 A | 9/1998 | Broer et al. |
| 5,828,488 A * | 10/1998 | Ouderkirk et al. .......... 359/487 |
| 5,897,184 A | 4/1999 | Eichenlaub et al. |
| 5,945,209 A | 8/1999 | Okazaki et al. |
| 5,961,198 A * | 10/1999 | Hira et al. .................... 362/31 |
| 6,044,196 A | 3/2000 | Winston et al. |
| 6,060,183 A | 5/2000 | Higashi et al. |
| 6,091,469 A | 7/2000 | Naito |
| 6,147,732 A | 11/2000 | Aoyama et al. |
| 6,181,394 B1 * | 1/2001 | Sanelle et al. ................ 349/96 |
| 6,196,692 B1 | 3/2001 | Umemoto et al. |
| 6,236,439 B1 | 5/2001 | Saiki et al. |
| 6,266,108 B1 | 7/2001 | Bao et al. |
| 6,285,426 B1 | 9/2001 | Akins et al. |
| 6,322,236 B1 | 11/2001 | Campbell et al. |
| 6,369,950 B1 | 4/2002 | Umemoto |
| 6,384,881 B1 | 5/2002 | Arai et al. |
| 2001/0010630 A1 | 8/2001 | Umemoto |
| 2001/0011779 A1 | 8/2001 | Stover |
| 2001/0012158 A1 | 8/2001 | Umemoto et al. |
| 2001/0012159 A1 | 8/2001 | Umemoto et al. |
| 2001/0053029 A1 | 12/2001 | Umemoto et al. |

\* cited by examiner

OPTICAL PATH CHANGING POLARIZER

BACKGROUND OF THE INVENTION

1. Field of the Invention

The present invention relates to an optical path changing polarizer by which the optical path of the light incident on one of side surfaces of a liquid-crystal display device is changed to a viewing direction efficiently, and with which it is possible to form a transmission type or reflection-transmission double type liquid-crystal display device which is small in thickness, which is light in weight, and display of which is bright and easy to view.

The present application is based on Japanese Patent Applications No. 2000-4242 and 2000-167162, which are incorporated herein by reference.

2. Description of the Related Art

Greater reduction in thickness, size and weight of transmission type liquid-crystal display devices has been demanded for purposes of suppression of increase in weight which is accompanied by increase in size of television and personal computer display screens, reduction in size and weight of portable personal computers and portable telephone sets, etc. In the meanwhile, it is difficult to reduce thickness, size and weight of a transmission type liquid-crystal display device provided with a back-lighting system using a background-art bottom type or side-lighting type light pipe. Incidentally, the bottom-type back-lighting system generally has a thickness of not smaller than 4 mm because an illuminator, a light diffusing plate and a reflector are disposed just under a liquid-crystal display panel. Even the side-lighting type light pipe has a thickness of not smaller than 1 mm under the necessity of light transmission. When a light diffusing plate, a reflector, a prism sheet, etc. are disposed on the side-lighting type light pipe, the total thickness generally reaches a value of not smaller than 3 mm.

A liquid-crystal display device in which a half-transmission type reflector is disposed between the aforementioned transmission type liquid-crystal display panel and a back-lighting system is heretofore known as a reflection-transmission double type liquid-crystal display device which can be viewed in a reflection mode by using external light. The half-transmission type reflector is disposed in order to make viewing in a reflection mode possible. If there is no half-transmission type reflector, viewing in a reflection mode by using external light is so dark that the liquid-crystal display device substantially hardly functions as a reflection type liquid-crystal display device. The addition of the half-transmission type reflector, however, makes the volume and weight of the liquid-crystal display device larger. Moreover, light is diverged into transmitted light and reflected light by the half-transmission type reflector. There is therefore a problem that not only viewing in a transmission mode but also viewing in a reflection mode becomes dark so that brightness in a reflection mode is inferior to that of a reflection exclusive type liquid-crystal display device using a high-reflectance reflection layer.

SUMMARY OF THE INVENTION

An object of the present invention is to develop an optical member by which the optical path of the light incident on one of side surfaces of a liquid-crystal display device is changed to a viewing direction efficiently, and with which it is possible to form a transmission type or reflection-transmission double type liquid-crystal display device which is small in thickness, which is light in weight, and display of which is bright and easy to view.

The optical path changing polarizer according to the present invention comprises: a polarizer; an adhesive layer disposed on one side of the polarizer, the adhesive layer having a refractive index different by 0.1 or less from a refractive index of a surface layer of the one side of the polarizer; and a repetitive prismatic structure disposed on the other side of the polarizer, the repetitive structure including optical path changing slopes aligned in a substantially constant direction so as to be inclined at an inclination angle in a range of from 35 to 48 degrees with respect to a plane of the polarizer.

According to the present invention, there is provided an optical path changing polarizer comprising: a polarizer including a polarizing element and a transparent protective layer disposed on at least one side of the polarizing element; an adhesive layer disposed on one side surface of the polarizer; and a repetitive prismatic structure disposed on the other side of the polarizer, the repetitive structure including optical path changing slopes aligned in a substantially constant direction so as to be inclined at an inclination angle of from 35 to 48 degrees with respect to a plane of the polarizer; wherein each of respective refractive indexes of the adhesive layer and a material for forming the optical path changing slopes is not lower than a refractive index of the polarizing element or the transparent protective layer.

The optical path changing polarizer according to the present invention is disposed along the viewing surface of a liquid-crystal cell having an illuminator on one of side surfaces of the cell. Hence, the optical path of the light incident on the side surface or the transmission light of the incident light is changed efficiently to the viewing direction of the liquid-crystal cell by optical path changing slopes disposed on the polarizer. Hence, the light can be utilized for liquid-crystal display in a transmission mode. Hence, it is possible to form a transmission type liquid-crystal display device which is small in thickness and light in weight, and which is bright and excellent in display quality. Moreover, because flat surface portions are disposed between the optical path changing slopes in the polarizer, external light can be made to enter efficiently through the flat surface portions. Hence, when the entering external light is reflected by the light reflection layer, the external light can be utilized for liquid-crystal display in a reflection mode. A reflection mode system can be formed as well as the aforementioned transmission mode system. Hence, it is possible to form a transmission-reflection double type liquid-crystal display device which is small in thickness and light in weight, and which is bright and excellent in display quality.

The aforementioned effect is produced by an optical path control type polarizer which mainly uses slope reflection to control the optical path of light. That is, the light incident on one of side surfaces of the liquid-crystal cell or the transmission light of the incident light is reflected by optical path changing slopes so that the optical path of the light can be changed with good directivity. Hence, good visibility in a transmission mode can be achieved. Moreover, flat surfaces can be disposed easily between the optical path changing slopes. Hence, external light is transmitted through the flat surfaces so that entering of external light can be ensured sufficient. Hence, good visibility in a reflection mode can be also achieved. If a scatter type polarizer 6 constituted by a polarizer P, and a scattering layer such as an anti-glare layer 61, or the like, disposed on the polarizer P as illustrated in FIG. 9 is bonded onto a liquid-crystal cell 2 through an adhesive layer 62, light for illuminating the liquid-crystal cell cannot be obtained substantially. In a method of scatter reflection by a roughened surface of a scattering sheet, or the like, it is difficult to achieve the aforementioned effect. Incidentally, JP-A-5-158033 discloses a reflection type liquid-crystal display device in which illumination light is made incident on one of side surfaces of a liquid-crystal cell and totally reflected by a visual side cell substrate and in which the reflected light is scattered by a roughened surface type reflector so that the scattered light is utilized for display.

In the aforementioned case, however, light allowed to be utilized for display is that which exits from the panel due to coming contrary against the total reflection condition by scattering. Generally, scattered light exhibits a normal distribution having a direction of regular reflection as a peak, in Extended Abstracts (the 20th Liquid-Crystal Discussion Lecture) 3 G510, Tohoku University; Uchida et al. Hence, the aforementioned display light is the light hardly utilized efficiently for display and greatly inclined with respect to a frontal (vertical) direction. Hence, the display becomes dark in the frontal direction. Nevertheless, intensifying scattering by the roughened surface type reflector is unfavorable for display in consideration of viewing in a reflection mode because the quantity of light in the frontal direction in the reflection mode is reduced (SID 96 DIGEST pp. 149–152). In the roughened surface scatter reflection method, it is, therefore, difficult to obtain scattering intensity favorable to the two modes because scattering intensity required of the transmission mode is antinomic to scattering intensity required of the reflection mode.

On the other hand, according to the present invention, the optical path control type polarizer, which uses slope reflection to control the optical path of light, mainly utilizes light exhibiting a peak in a direction of regular reflection and controls the optical path of the reflected light. Hence, directivity, especially frontal directivity, favorable for display can be provided easily. Hence, a bright transmission mode can be achieved. Also in a reflection mode, flat portions of the polarizer except the optical path changing slopes can be utilized, and efficient entrance, reflection and transmission of external light can be ensured. Hence, the state of light can be balanced easily so as to be favorable to both reflection and transmission modes. Moreover, in the transmission mode, the optical path changing polarizer is bonded to a liquid-crystal cell, or the like. Hence, when the refractive index of a material for forming the adhesive layer and the optical path changing slopes is selected to be not lower than the refractive index of the polarizing element or transparent protective layer, total reflection of the light incident on one of side surfaces of the liquid-crystal cell or the transmission light of the incident light through the adhesive layer or through the polarizer is suppressed so that the light incident on the side surface, or the like, can be made incident on the optical path changing slopes efficiently. Particularly with respect to the light which is incident on one of side surfaces of the liquid-crystal cell, and which makes a small angle (approximately parallel) with respect to the liquid-crystal cell plane so that the light will be transmitted to a position far from the incidence side surface, total reflection of the light is suppressed efficiently so that brightness and uniformity of brightness can be improved on the whole screen.

Features and advantages of the invention will be evident from the following detailed description of the preferred embodiments described in conjunction with the attached drawings.

DETAILED DESCRIPTION OF THE PREFERRED EMBODIMENTS

Figure 1A:
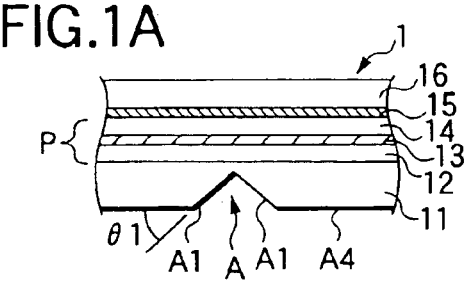
FIGS. 1A to 1I are explanatory side views showing examples of an optical path changing polarizer (optical path changing slopes)

The optical path changing polarizer according to the present invention comprises: a polarizer; an adhesive layer disposed on one side of the polarizer, the adhesive layer having a refractive index different by 0.1 or less from a refractive index of a surface layer of the one side of the polarizer; and a repetitive prismatic structure disposed on the other side of the polarizer, the repetitive prismatic structure including optical path changing slopes aligned in a substantially constant direction so as to be inclined at an inclination angle in a range of from 35 to 48 degrees with respect to a plane of the polarizer.

Also, the optical path changing polarizer according to the present invention comprises: a polarizer including a polarizing element and a transparent protective layer disposed on at least one side of the polarizing element; an adhesive layer disposed on one side surface of the polarizer; and a repetitive prismatic structure disposed on the other side of the polarizer, the repetitive prismatic structure including optical path changing slopes aligned in a substantially constant direction so as to be inclined at an inclination angle of from 35 to 48 degrees with respect to a plane of the polarizer; wherein each of respective refractive indexes of the adhesive layer and a material for forming the optical path changing slopes is not lower than a refractive index of the polarizing element or the transparent protective layer. FIGS. 1A to 1G show examples of the optical path changing polarizer. In FIGS. 1A to 1I, the reference numeral 1 designates an optical path changing polarizer; and 11 or 11a, a repetitive prismatic structure layer, that is, a repetitive structure layer of a plurality of optical path changing means A having optical path changing slopes A1. The reference numerals 12 and 14 designate transparent protective layers; and 13, a polarizing element. The transparent protective layers 12 and 14 and the polarizing element 13 constitute a polarizer P. The reference numeral 15 designates an adhesive layer on a surface of the polarizer P; and 11b, a second adhesive layer. The reference numeral 16 designates a strip sheet.

A suitable plate composed of a polarizing element, and at least one transparent protective layer disposed on at least one side of the polarizing element can be used as the polarizer without any particular limitation. Generally, as shown in the drawings, examples of the polarizer that can be used include: a polarizer P constituted by a polarizing element 13 made of a polarizing film, or the like, and transparent protective layers 12 and 14 bonded to both sides (or one side) of the polarizing element 13; a combination of a transparent protective layer as a support and a polarizing layer (polarizing element) which is made of liquid crystal, or the like, and which is bonded to the support; and so on. From the point of view of obtaining good-contrast-ratio display due to incidence of highly linearly polarized light, etc., an absorption type polarizing film made of a drawn film having a dichromatic material such as iodine or dichromatic dye adsorbed on a hydrophilic macromolecular film such as a polyvinyl alcohol film, a partially formalized polyvinyl alcohol film or a partially saponified ethylene-vinyl acetate copolymer film may be preferably used. Or a film high in the degree of polarization such as the absorption type polarizing film may be preferably used.

A material excellent in transparency, mechanical strength, thermal stability, moisture shielding characteristic, etc. is preferably used for the formation of the transparent protective layer. Examples of the material include: polymers such as acetate resin, polyester resin, polyether-sulfone resin, polycarbonate resin, polyamide resin, polyimide resin, polyolefin resin, acrylic resin, polyether resin, polyvinyl chloride resin, styrene resin and norbornene resin; heat-curable or ultraviolet-curable resins such as acrylic resin, urethane resin, acrylic urethane resin, epoxy resin, silicone resin, etc.; and so on. The transparent protective layer may be bonded as a film by a bonding method or may be applied as polymer liquid by a coating method, and so on. A transparent protective layer provided as a film, or the like, may be used as a support when the polarizing layer is formed by a coating method, or the like.

Figure 7:
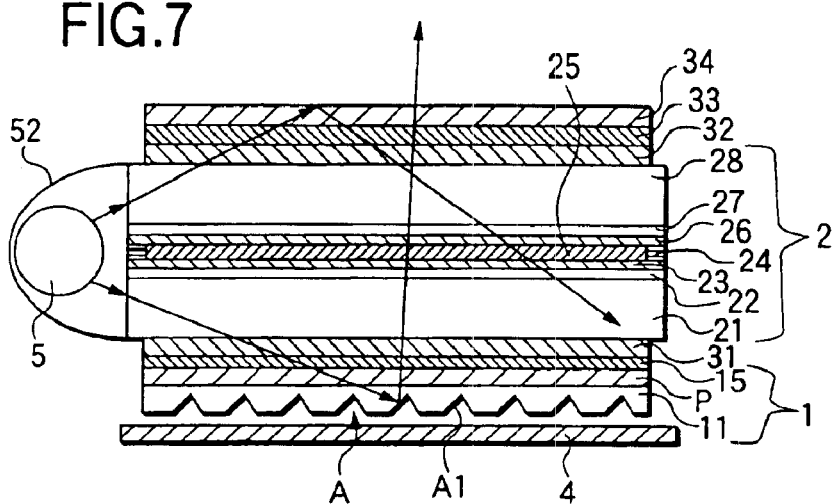
FIG. 7 is an explanatory sectional view showing an example of a transmission type (reflection-transmission double type) liquid-crystal display device.

As shown in FIG. 7, the optical path changing polarizer 1 is disposed along a viewing surface of a liquid-crystal cell 2 having an illuminator 5 on one of its side surfaces. That is, the light incident on the side surface from the illuminator 5 or the transmission light of the incident light is reflected by the optical path changing slopes A1 as indicated by the arrow in FIG. 7. The optical path of the reflected light is changed toward a non-slope-forming surface of the polarizer P, that is, toward the viewing direction of the liquid-crystal cell 2, so that the light is made to exit from the polarizer. This is the purpose of the optical path change. The exit light is utilized as illumination light (display light) for the liquid-crystal cell, etc.

To achieve the aforementioned purpose, the optical path changing polarizer 1 is provided with slopes A1 as shown in FIGS. 1A to 1I. The slopes A1 are provided on one side of the polarizer P, and reflect the incident light on one of side surfaces or the transmission light of the incident light to thereby change the optical path of the light. On this occasion, from the point of view of obtaining illumination light excellent in frontal directivity through optical path change, the optical path changing polarizer 1 is configured as shown in FIGS. 1A to 1I. That is, according to the present invention, the optical path changing polarizer 1 is formed to have a repetitive prismatic structure, that is, a repetitive structure of a plurality of optical path changing means A containing optical path changing slopes A1 aligned in an approximately constant direction so as to be inclined at an inclination angle $\theta1$ in a range of from 35 to 48 degrees with respect to the polarizer plane A4.

Figure 1B:
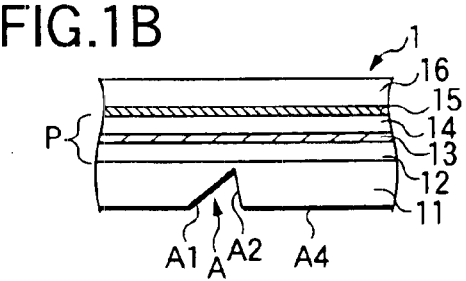
Figure 1C:
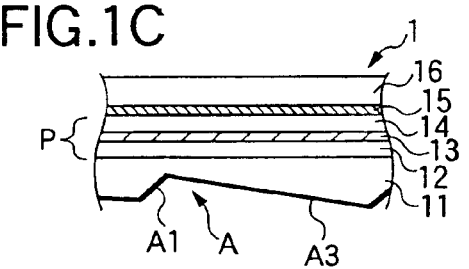
Figure 1D:
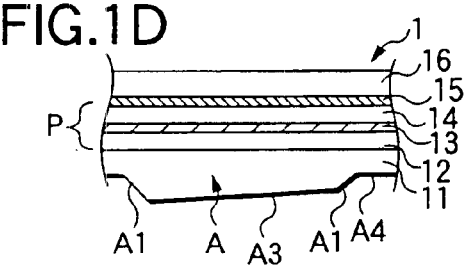
Figure 1E:
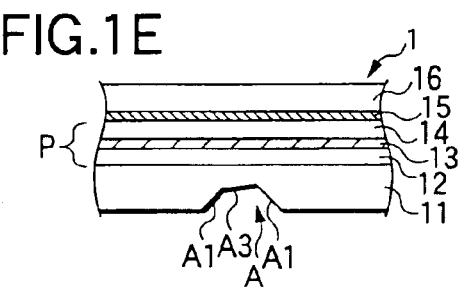
Figure 1F:
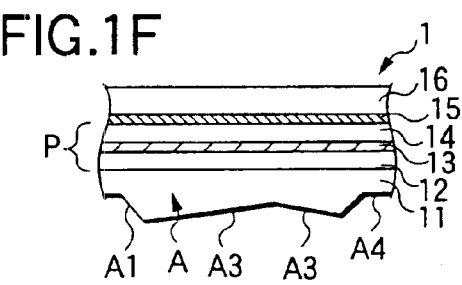
Figure 1G:
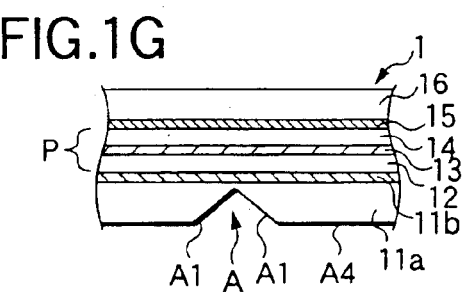
Figure 1H:
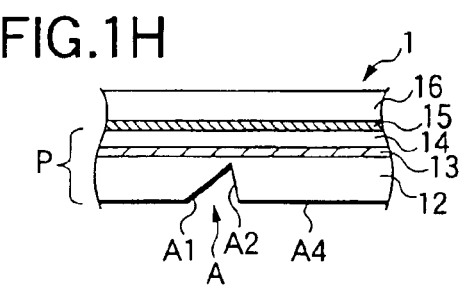
Figure 1I:
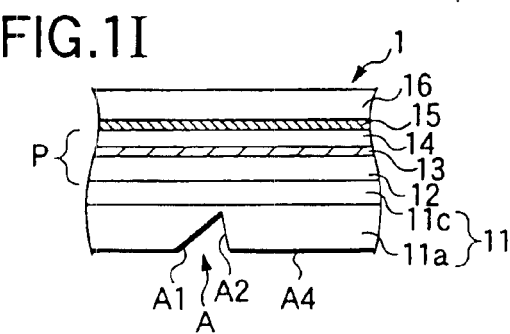

FIGS. 1A to 1I show various examples of each of the plurality of optical path changing means A having optical path changing slopes A1. In FIGS. 1A to 1C and FIGS. 1G to 1I, each of the optical path changing means A is substantially shaped like a triangle in section. In FIGS. 1D and 1E, each of the optical path changing means A is substantially shaped like a tetragon in section. In FIG. 1F, each of the optical path changing means is substantially shaped like a pentagon in section. In FIGS. 1A and 1G, each of the optical path changing means A has two optical path changing slopes A1 and is shaped like an isosceles triangle in section. In FIGS. 1B, 1H and 1I, each of the optical path changing means A has an optical path changing slope A1, and a steep slope A2 having an inclination angle larger than that of the slope A1. In FIG. 1C, the optical path changing means A are provided as a repetitive structure of optical path changing means A each having a combination of an optical path changing slope A1 and a gentle slope A3 having an inclination angle smaller than that of the slope A1. In FIG. 1C, the optical path changing means A are formed over the whole surface of one side of the polarizer so that they are adjacently continued to one another. In FIGS. 1A to 1C, FIG. 1E and FIGS. 1G to 1I, each of the optical path changing means A is constituted by a concave portion (groove). In FIGS. 1D and 1F, each of the optical path changing means A is constituted by a convex Hence, the optical path changing means may be formed from concave or convex portions constituted by equal-side surfaces or slopes having equal inclination angles as described above. Alternatively, the optical path changing means may be formed from concave or convex portions constituted by a combination of optical path changing slopes and steep or gentle slopes, or slopes different in inclination angle. The shape of the optical path changing means can be determined suitably in accordance with the number of incidence side surfaces and the position of each incidence side surface on which the light is incident. From the point of view of improving mar-proofness to keep the slope function high, a plurality of optical path changing means constituted by concave portions (in a structure of grooves) are superior to a plurality of optical path changing means constituted by convex portions because the slopes, etc., in the concave portions are hardly damaged.

The optical path changing polarizer preferable from the point of view of achieving the aforementioned characteristic such as frontal directivity has optical path changing slopes A1 aligned so as to face the incidence side surface. Hence, when light is made incident on two or more side surfaces of the optical path changing polarizer 1, for example, as shown in FIG. 8, it is preferable to use an optical path changing polarizer having optical path changing slopes A1 corresponding to the number and positions of the incidence side surfaces.

Figure 8:
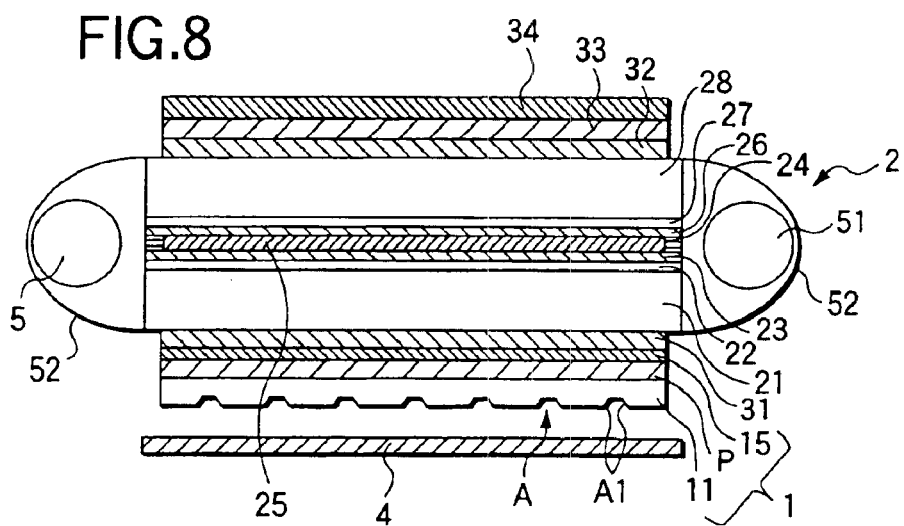
FIG. 8 is an explanatory sectional view showing another example of the transmission type (reflection-transmission double type) liquid-crystal display device.

Incidentally, when opposite two side surfaces of the optical path changing polarizer are used as incidence side surfaces on which the light is incident as shown in FIG. 8, there is preferably used an optical path changing polarizer 1 constituted by a plurality of optical path changing means containing two or more kinds of optical path changing slopes. Among the two or more kinds of optical path changing slopes, one kind of optical path changing slopes serve as a reference and are aligned in an approximately constant-direction while another kind of optical path changing slopes are aligned in another direction and opposite to the reference optical path changing slope. Examples of the optical path changing polarizer preferably used include: an optical path changing polarizer 1 constituted by a plurality of optical path changing means A each of which is shaped like an isosceles triangle in section by two optical path changing slopes A1 as shown in FIG. 1A or 1G; and an optical path changing polarizer 1 constituted by a plurality of optical path changing means A each of which contains two optical path changing slopes A1 and each of which is substantially shaped like a trapezoid, a tetragon or a pentagon in section as shown in FIGS. 1D, 1E and 1F so that the ridgelines each of which is constituted by the two optical changing slopes A1 are parallel to the incidence side surfaces respectively.

When two adjacent cross side surfaces of the optical path changing polarizer are used as incidence side surfaces on which the light is incident, there is preferably used an optical path changing polarizer having two kinds of optical path changing slopes A1 corresponding to the incidence side surfaces so that the ridgelines of the two kinds of optical path changing slopes A1 are parallel to the two cross side surfaces respectively. When three or more side surfaces inclusive of opposite side surfaces and adjacent cross side surfaces are used as incidence side surfaces on which the light is incident, there is preferably used an optical path changing polarizer having optical path changing slopes A1 constituted by a combination of the aforementioned slopes.

As described above, the optical path changing slopes A1 play a role of reflecting the light incident on the slopes A1, among the light incident on the incidence side surface and the transmission light of the incident light, to thereby change the optical path of the light. In this case, when the inclination angle θ1 of each of the optical path changing slopes A1 with respect to the polarizer plane is selected to be in a range of from 35 to 48 degrees as shown in FIG. 1A, the optical path of the light incident on the side surface or the transmission light of the incident light can be changed so as to be sufficiently perpendicular to the polarizer plane. Accordingly, illumination light excellent in frontal directivity can be obtained efficiently.

If the inclination angle θ1 is smaller than 35 degrees, the optical path of the reflected light is largely shifted by 30 degrees or more from the frontal direction. Accordingly, the reflected light is difficult to be utilized efficiently for display, and frontal luminance may therefore run short. On the other hand, if the inclination angle θ1 is larger than 48 degrees, the condition for total reflection of the light incident on the incidence side surface or the transmission light of the incident light cannot be satisfied. Accordingly, light leaking from the optical path changing slopes increases, and efficiency of utilization of the light incident on the side surface may therefore run short. From the point of view of optical path change excellent in frontal directivity, suppression of leaking light, etc., and in consideration of the condition for total reflection of the transmission light on the basis of refraction in Snell's law, the inclination angle θ1 of each of the optical path changing slopes A1 is preferably in a range of from 38 to 45 degrees, more preferably in a range of from 40 to 44 degrees.

The plurality of optical path changing means A having the optical path changing slopes A1 are formed as a repetitive prismatic structure for the purpose of reducing the thickness of the optical path changing polarizer. In this case, from the point of view of reflecting backward the light incident on the incidence side surface and transmitting the reflected light toward the counter side surface efficiently to thereby emit light on the whole surface of the polarizer as uniformly as possible, it is preferable that the optical path changing means A are formed as a structure including flat surfaces which are constituted by gentle slopes A3 inclined at an inclination angle of not larger than 5 degrees, particularly not larger than 4 degrees, more particularly not larger than 3 degrees with respect to the polarizer plane, or which are constituted by polarizer surfaces A4 inclined at an inclination angle of about 0 degree with respect to the polarizer plane as shown in FIGS. 1A to 1I. Therefore, the optical path changing means A including steep slopes A2 as illustrated in FIGS. 1B, 1H and 1I are preferably formed as a structure in which the angle of the steep slopes is selected to be not smaller than 35 degrees, particularly not smaller than 50 degrees, more particularly not smaller than 60 degrees so that the width of the polarizer surfaces A4 an be enlarged.

When a light reflection layer 4 is disposed on the back side of the optical path changing polarizer 1 as illustrated in FIGS. 7 and 8, the flat surfaces constituted by gentle slopes A3 or polarizer surfaces A4 an function as portions on which external light is made incident and through which the reflected light of the incident light by the light reflection layer 4 is transmitted. Hence, display can be made in a reflection mode by using external light when the illuminator is switched off. Hence, a reflection-transmission double type liquid-crystal display device can be formed.

In the aforementioned case, particularly when the optical path changing means A are formed as a repetitive structure in which the optical path changing means A are adjacent to one another and each of the means A has slopes A1 and A3 as shown in FIG. 1C, the angle difference between inclination angles of the gentle slopes A3 with respect to the polarizer plane is selected preferably to be not larger than 5 degrees, more preferably not larger than 4 degrees, further preferably not larger than 3 degrees on the whole of the optical path changing polarizer, and the angle difference between inclination angles of adjacent ones of the gentle slopes is selected preferably to be not larger than 1 degree, more preferably not larger than 0.3 degrees, further preferably not larger than 0.1 degrees. This angle selection is to prevent the optical path of the light reflected by the gentle slopes A3 from changing largely, especially from changing largely in between adjacent ones of the gentle slopes. This rule also applies to the plurality of optical path changing means A constituted by the slopes A1 and A3 as shown in FIG. 1F.

From the point of view of obtaining bright display in an external light mode, the projected area or width, on the polarizer plane, of the flat surfaces constituted by gentle slopes A3 or polarizer surfaces A4 each having an inclination angle of not larger than 5 degrees with respect to the polarizer plane is selected preferably to be not smaller than 10 times, more preferably not smaller than 12 times, further preferably not smaller than 15 times as large as the projected area or width, on the polarizer plane, of the slopes A1 or A2 each having an inclination angle of not smaller than 35 degrees with respect to the polarizer plane on which the optical path changing means A are formed. This projected area or width selection is to improve efficiency of incidence of external light and efficiency of transmittance of the light reflected by the light reflection layer.

Figure 2:
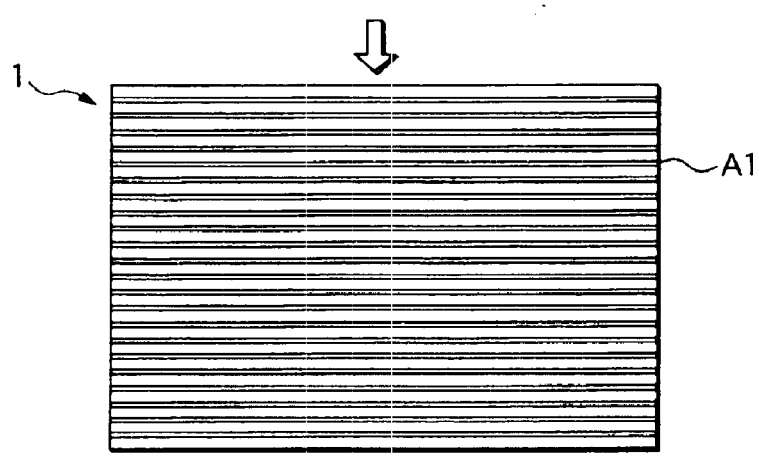
FIG. 2 is an explanatory plan view showing an example of optical path changing slopes.
Figure 3:
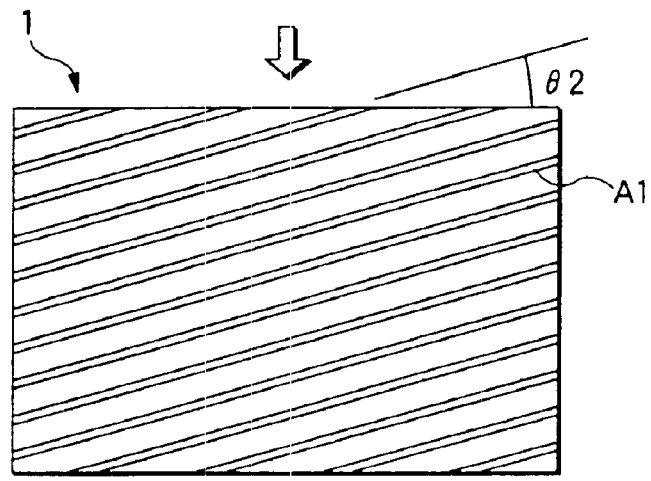
FIG. 3 is an explanatory plan view showing another example of the optical path changing slopes.
Figure 4:
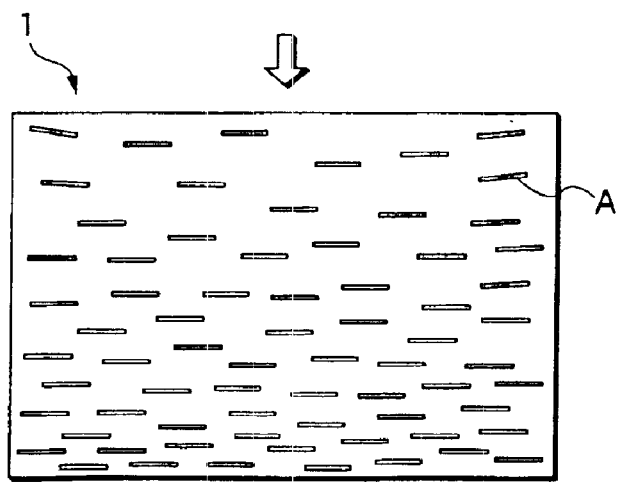
FIG. 4 is an explanatory plan view showing a further example of the optical path changing slopes.

As illustrated in FIGS. 2 to 4, the plurality of optical path changing means A are provided so that the ridgelines of the optical path changing means A are parallel to or inclined to the incidence side surface on which light is incident. In this case, the optical path changing means A may be formed so as to be continued from one end to the other end of the optical path changing polarizer 1 as illustrated in FIGS. 2 and 3, or may be formed intermittently and discontinuously as illustrated in FIG. 4. When the plurality of optical path changing means A are formed discontinuously, it is preferable from the point of view of efficiency of incidence of the transmission light, efficiency of changing the optical path, etc. that the length of each prismatic structure made of a groove or a protrusion along the direction of the incidence side surface is selected to be not smaller than 5 times as large as the depth or height of the prismatic structure. It is further preferable from the point of view of uniform light emission on the polarizer that the length is selected to be not larger than 500 µm, particularly in a range of from 10 to 480 µm, more particularly in a range of from 50 to 450 µm.

Any suitable surface shape such as a linear surface, a bent surface, a curved surface, etc., may be formed as the shape of each of the slopes for constituting the optical path changing means A. The sectional shape of the optical path changing means A and the repetition pitch of the optical path changing slopes A1 which defines the sectional shape of the optical path changing means A are not particularly limited. They can be determined suitably in accordance with the uniformity of light emission on the polarizer in a transmission (switching-on) mode because the optical path changing slopes A1 are factors for determining luminance in the transmission mode. They can be further determined suitably in accordance with the uniformity of light emission in an external light mode in a reflection-transmission double type liquid-crystal display device. Hence, the quantity of light the optical path of which is changed can be controlled on the basis of the distribution density of the slopes.

Figure 5:
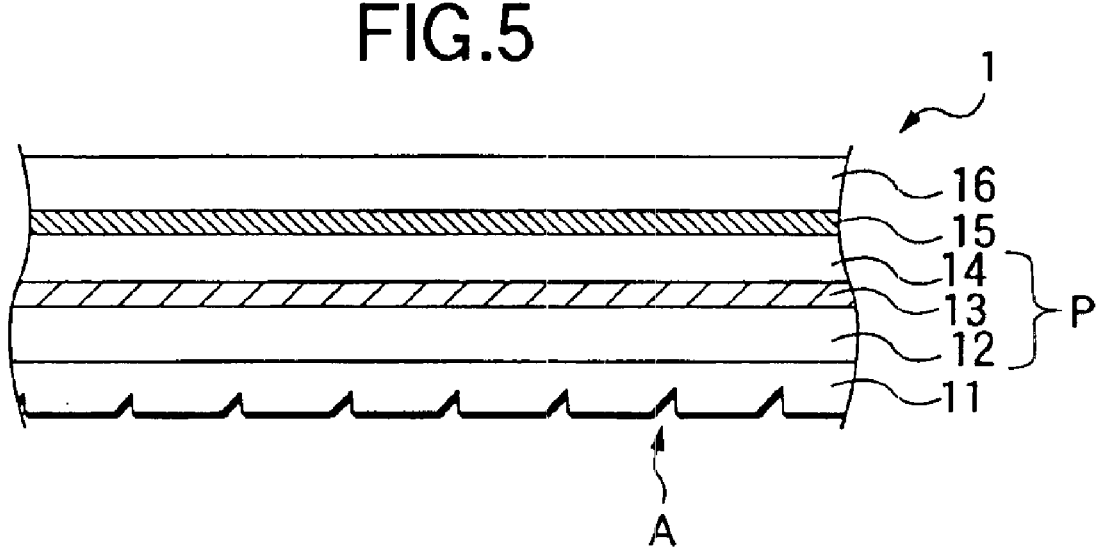
FIG. 5 is an explanatory side view showing another example of the optical path changing polarizer.
Figure 6:
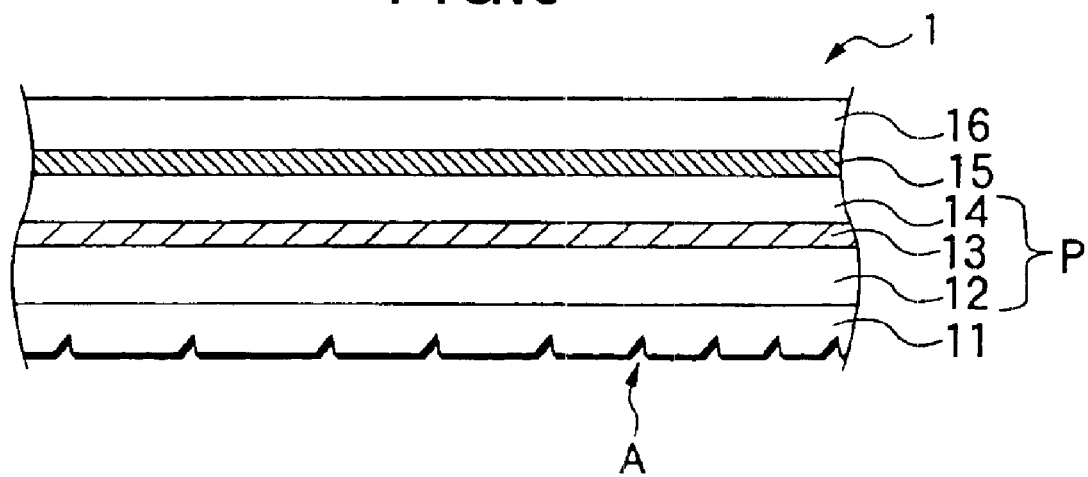
FIG. 6 is an explanatory side view showing a further example of the optical path changing polarizer.

Therefore, the inclination angles of the slopes A1, A2, A3, etc., may be uniform on the whole surface of the polarizer, or may be changed so that the optical path changing means A is enlarged as the location goes farther from the incidence side surface on which the light is incident, as illustrated in FIG. 5, for the purpose of making light emission on the polarizer uniform against absorption loss and attenuation of transmission light due to the optical path changing. The optical path changing means A may be disposed at regular intervals of a predetermined pitch as illustrated in FIGS. 2 and 3. Alternatively, the optical path changing means A may be disposed at irregular intervals so that the pitch is shortened as the location goes farther from the incidence side surface on which the light is incident. Accordingly, the distribution density of the optical path changing means A is made high as illustrated in FIGS. 4 and 6.

Alternatively, the optical path changing means may be disposed at a random pitch so that light emission on the polarizer can be made uniform. The random pitch is favorable to prevention of moire caused by interference with pixels. Therefore, the optical path changing means A may be constituted by a combination of prismatic structures different in shape, or the like, in addition to pitch. Particularly when the optical path changing means A are constituted by prismatic structures which are discontinuous grooves or protrusions; dimensions and shapes of the prismatic structures, and distribution density, ridgeline direction, etc. of the prismatic structures may be made irregular; or irregular grooves or protrusions and regular/uniform grooves or protrusions may be disposed at random to attain uniformity of light emission on the display screen of the panel. Therefore, as described above, uniformity of light emission on the display screen of the panel can be achieved by application of a suitable method to the optical path changing means A. In FIGS. 2 to 6, the arrow shows the direction of transmission of the light incident on the incidence side surface.

When a reflection-transmission double type liquid-crystal display device is provided, unnatural display may be caused by shortage of transmission of display light if the optical path changing slopes A1 overlap pixels of the liquid-crystal cell. From the point of view of preventing the unnatural display from occurring, etc., it is preferable that the overlap area is reduced as much as possible to thereby keep sufficient light transmittance through the flat surfaces A3 or A4. From this point of view and in consideration that the pixel pitch of the liquid-crystal cell is generally in a range of from 100 to 300 µm, each of the optical path changing slopes A1 is selected preferably to be not larger than 40 µm, more preferably in a range of from 3 to 20 µm, further preferably in a range of from 5 to 15 µm in terms of the projected width on the polarizer plane. The projected width is also preferable from the point of view of preventing display quality from being lowered because of diffraction in consideration that the coherent length of a fluorescent tube is generally about 20 µm.

It is preferable from the aforementioned point of view that the distance between adjacent ones of the optical path changing slopes A1 is large. As described above, however, the optical path changing slopes serve as a functional portion for substantially generating illumination light by changing the optical path of the light incident on the side surface. Hence, if the distance is too large, illumination becomes sparse in a switched-on mode so that display may be unnatural. In consideration of these facts, the repetition pitch of the optical path changing slopes A1 is preferably selected to be not larger than 5 mm, more preferably in a range of from 20 µm to 3 mm, further preferably in a range of from 50 µm to 2 mm.

When the optical path changing means are constituted by a repetitive prismatic structure, moire may occur because of interference between the optical path changing means and the pixels of the liquid-crystal cell. Although moire can be prevented by adjustment of the pitch in the repetitive prismatic structures, the pitch in the repetitive prismatic structures is limited to the aforementioned preferable range. Hence, measures against the case where moire still occurs even if the pitch is in the aforementioned range comes into a question. In the present invention, it is preferable to use a method in which the ridgelines of the prismatic structures are formed to be inclined with respect to the incidence side surface so that the repetitive prismatic structures can be arranged to cross the pixels to thereby prevent moire, as illustrated in FIG. 3.

On this occasion, if the inclination angle $\theta 2$ to the incidence side surface is too large, deflection occurs in reflection by the optical path changing slopes A1. As a result, large deviation occurs in the direction of changing of the optical path. This large deviation is apt to cause lowering of display quality. Therefore, the inclination angle $\theta 2$ of the ridgelines to the incidence side surface is selected preferably to be in a range of ±30 degrees, more preferably in a range of ±25 degrees, further preferably in a range of ±20 degrees. Incidentally, the symbol "±" means the direction of inclination of the ridgelines with the incidence side surface as a reference. If the resolution of the liquid-crystal cell is so low that moire never occurs or if moire is negligible, it is preferable that the ridgelines are arranged to be as parallel with the incidence side surface as possible.

The optical path changing means can be formed by a suitable method. Examples of the suitable method include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, by ultraviolet rays or by radial rays such as electron rays is polymerized in the condition that the fluid resin is filled or cast in a mold which is capable of forming a predetermined shape; and so on.

The preferable example of the method for forming the optical path changing means is a method in which a repetitive prismatic structure having optical path changing slopes is given to one surface of a transparent film by a mold having the predetermined prismatic structures. A specific example of the method comprises the steps of: applying a curable resin polymerizable by ultraviolet rays, radial rays, or the like, onto one surface of a transparent film; curing the applied curable resin by irradiation with ultraviolet rays, radial rays, or the like, while bringing the coating layer into close contact with a surface of the mold on which the predetermined prismatic structures is formed; and stripping off and collecting the film from the mold.

Therefore, the optical path changing polarizer may be formed as a suitable structure having a plurality of optical path changing means A on one side of the polarizer P. For example, as shown in FIGS. 1A to 1F, a layer 11 which is made of the same kind of resin as or a different kind of resin from the transparent protective layer 12 and which has a plurality of optical path changing means A may be added to the transparent protective layer 12 in the polarizer P. Alternatively, as shown in FIG. 1H, the optical path changing means A may be integrated with the polarizer P, especially with the transparent protective layer 12 in the polarizer P by integral molding so that the transparent protective layer 12, especially the transparent protective layer 12 in the polarizer p has the optical path changing means A. Alternatively, as shown in FIG. 1G, a transparent film 11a having a plurality of optical path changing means A formed on its one side may be bonded with its other side onto the polarizer P through a second adhesive layer 11b. The other side of the film 11a has no optical path changing means formed thereon.

Alternatively, as illustrated in FIG. 1I, a superposed body 11 composed of the transparent film 11a and an optical path changing means layer 11c which is made of the same kind of resin as or a different kind of resin from the transparent layer film 11a and which is attached to the transparent film 11b may be bonded onto the polarizer P.

When the method of adding the layer 11 to the transparent protective layer 12, the method of adhering the transparent film 11a, or the like, is used, the optical path changing means layer 11 or the transparent film 11a can be formed from a suitable material which exhibits transparency corresponding to the wavelength range of the incident light from the illuminator, or the like, and which satisfies a predetermined refractive index. Incidentally, examples of the suitable material used in a visible light range include: transparent resins as represented by acrylic resin, polycarbonate resin, cellulose resin, norbornene resin, or the like; curable resins polymerizable by heat or by ultraviolet rays or by radial rays such as electron rays; and so on; as described above in the description of the transparent protective layer. Especially, a material exhibiting no birefringence or small birefringence may be preferably used to thereby form the optical path changing means layer 11 as a layer small in phase difference.

When a bonding process is carried out, internal stress may occur in the optical path changing means layer during the process. From the point of view of preventing phase difference from occurring because of the internal stress, a material having a small photoelastic coefficient is used preferably.

Moreover, when the difference between the refractive index of the optical path changing means layer added to the polarizer and the refractive index of the polarizing element or transparent protective layer in the polarizer is large, light exit efficiency may be largely lowered because of interface reflection, or the like. From the point of view of preventing the large lowering of light exit efficiency to attain improvement in light exit efficiency, a material having a refractive index which is not lower than the refractive index of the polarizing element or/and transparent protective layer in the polarizer is preferably used as the material for forming the optical path changing slopes. Especially, a material having a refractive index higher by at least 0.02 than the refractive index of the polarizing element or/and transparent protective layer in the polarizer is used preferably for forming the optical path changing slopes. Incidentally, the thickness of the optical path changing means layer can be determined suitably. From the point of view of reduction in thickness, etc., however, the thickness of the optical path changing means layer is generally selected to be not larger than 300 μm, particularly in a range of from 5 to 200 μm, more particularly in a range of from 10 to 100 μm.

An adhesive layer 15 for bonding the optical path changing polarizer to a support member such as a liquid-crystal cell is provided on a surface of the polarizer P on which the repetitive prismatic structure 11 is not provided as shown in FIGS. 1A to 1I. The adhesive layer is formed as a layer having a refractive index not lower than the refractive index of the polarizing element or/and transparent protective layer in the polarizer. Hence, total reflection in the interface between the adhesive layer and the polarizing element, or the like, can be suppressed so that the light incident on the side surface or the transmission light of the incident light can be made incident on the optical path changing slopes A1 of the plurality of optical path changing means A efficiently. Hence, effective utilization of the light incident on the side surface makes it possible to attain improvement of luminance, etc.

From the point of view of efficiency of incidence of the incident light or the transmission light thereof from the side surface to the optical path changing slopes, etc., the adhesive layer has a refractive index, preferably, higher by at least 0.01, more preferably higher by at least 0.02 than the refractive index of the polarizing element or/and transparent protective layer in the polarizer. For the same reason, the second adhesive layer for bonding the transparent film having the optical path changing means onto the polarizer preferably has a refractive index of not lower, more preferably has a refractive index higher by at least 0.02 than the refractive index of the polarizing element or/and transparent protective layer in the polarizer.

In contrast, it is necessary to suppress interface reflection performed on the basis of the refractive index difference between the adhesive layer and the surface member such as the transparent protective layer of the polarizer. From this point of view, an adhesive layer having a refractive index different by 0.1 or less, especially 0.08 or less, more especially 0.05 or less from the refractive index of the surface member such as the transparent protective layer of the polarizer is preferably used in the present invention.

Therefore, it is preferable to set the refractive index difference between the adhesive layer and the surface member of the polarizer in the range of 0 to 0.1.

The surface adhesive layer or second adhesive layer can be formed from a suitable adhesive agent exhibiting the aforementioned refractive index characteristic. From the point of view of handling properties such as facilitation of the bonding process, a tacky layer is preferably used as the adhesive layer. A suitable tackiness agent can be used for the formation of the tacky layer. The suitable tackiness agent contains, as a base polymer, a suitable polymer such as a rubber polymer, an acrylic polymer, a vinyl-alkyl-ether polymer, a silicone polymer, a polyester polymer, a polyurethane polymer, a polyether polymer, polyamide polymer, a styrene polymer, etc. Especially, a tackiness agent excellent in transparency, weather resistance, heat resistance, etc. such as an acrylic tackiness agent containing, as a base polymer, a polymer mainly containing alkyl ester of acrylic acid or methacrylic acid is used preferably to form the tacky layer.

As transparent particles mixed with the adhesive layer, there can be used one or two or more members suitably selected from the group consisting of inorganic particles of silica, alumina, titania, zirconia, tin oxide, indium oxide, cadmium oxide, antimony oxide, or the like, which may be electrically conductive; and organic particles of a crosslinked or non-crosslinked polymer, or the like. In such a manner, the adhesive layer may be made to be of a light diffusion type. When a surface of the tacky layer as the adhesive layer 15 is exposed, a strip sheet 16 may be preferably temporarily bonded to the exposed surface of the adhesive layer as shown in FIGS. 1A to 1G so that the exposed surface of the adhesive layer is covered with the strip sheet 16 for the purpose of anti-contamination against deposition of foreign matter, etc., before the tacky layer is put into practical use. Incidentally, from the point of view of suppressing total reflection in the interface between the surface adhesive layer and a subject to be bonded such as the liquid-crystal cell for bonding the subject onto the surface adhesive layer, especially between the surface adhesive layer and the liquid-crystal cell substrate so that the light incident on the side surface or the transmission light of the incident light is made to enter the optical path changing polarizer efficiently, the refractive index difference between the adhesive layer and the liquid-crystal cell substrate, or the like, is preferably as small as possible, more preferably not larger than 0.15, further preferably not larger than 0.10 in accordance with the above description.

A base material such as a sheet for the purpose of protecting the optical path changing slopes may be disposed closely on a surface of the optical path changing polarizer on which the optical path changing means are formed. As shown in FIGS. 7 and 8, the optical path changing polarizer may be also formed so that a light reflection layer 4 is disposed closely on a surface of the polarizer P on which the optical path changing means are formed. The light reflection layer is provided for reflecting and inverting light leaking from a surface of the polarizer on which the optical path changing slopes are formed, and provided for making the light enter the polarizer again. As a result, light utilizing efficiency can be improved, so that a reflection-transmission double type liquid-crystal display device can be formed.

The light reflection layer can be formed of a suitable material such as a white sheet similarly to the background art. Especially, an example of the high-reflectance light reflection layer is constituted by: a coating layer containing powder of a high-reflectance metal such as aluminum, silver, gold, copper, chromium, etc., or alloy powder of such a high-reflectance metal in a binder resin; a layer of the above-mentioned metal or a dielectric multilayer film deposited by a suitable thin-film forming method such as a vacuum vapor deposition method, a sputtering method, or the like; a reflection sheet having the coating layer or the deposited layer supported by a base material made of a polarizer, or the like; a sheet of metal foil; and so on. The high-reflectance light reflection layer is especially preferably used for forming a reflection-transmission double type liquid-crystal display device.

The light reflection layer to be formed may exhibit a light diffusing function. The light reflection layer has a diffuse reflection surface for diffusing the reflected light to thereby attain improvement in frontal directivity. When the light reflection layer is formed by a surface roughening process, the light reflection layer can prevent the production of Newton rings due to its close contact to the polarizer to thereby improve visibility.

The formation of the light reflection layer of the light diffusion type can be made by a method, for example, comprising the steps of: forming a surface of a film base material as a fine prismatic structure by a suitable method such as a surface roughening method using sandblasting, matting, or the like, or a particle adding method; and providing a reflection layer on the film base material so that the fine prismatic structure is reflected in the reflection layer. The light reflection layer having such a fine prismatic structure to reflect the fine prismatic structure on the surface of the film base material can be formed by providing a metal on the surface of the film base material by a suitable vapor deposition or plating method such as a vacuum vapor deposition method, anion-plating method, a sputtering method, or the like.

The optical path changing polarizer according to the present invention has optical path changing slopes by which the optical path of the light incident on the side surface from the illuminator, or the like, or the transmission light of the incident light is changed to a direction excellent in perpendicularity in favor of viewing. Hence, light can be made to exit with good light utilizing efficiency. Moreover, the optical path changing polarizer exhibits good transmittance to external light. When the optical path changing polarizer is disposed on the visual side (front side) or opposite side (back side) of the liquid-crystal cell 2 provided with the illuminator 5 or 51 disposed on at least one side of the liquid-crystal cell 2 as shown in FIGS. 7 and 8, it is possible to form various devices such as a transmission type liquid-crystal display device which is bright and easy to view, a reflection-transmission double type liquid-crystal display device which is excellent in power saving, or the like.

Incidentally, in the liquid-crystal display device according to the present invention, a great part of the light incident on the incident side surface from the illuminator 5 or 51 is transmitted backward through reflection in accordance with the law of refraction by the upper and lower cell substrates 21 and 28 on the basis of thickness proportion of respective layers in the liquid-crystal cell 2. While light exit (leakage) from the surface of the cell is prevented, the optical path of the light incident on the optical path changing slopes A1 of the optical path changing polarizer 1 is efficiently changed to the viewing direction, that is, to the frontal direction. The other part of the light incident on the incident side surface is transmitted backward by total reflection and made incident on the optical path changing slopes A1 on the back side. The optical path of the other part of the light is efficiently changed to the viewing direction. Hence, display excellent in brightness on the whole surface of the cell display screen can be achieved.

In the above description, a suitable transmission type liquid-crystal cell can be used as the liquid-crystal cell 2.

That is, as illustrated in FIGS. 7 and 8, it is possible to use, as the liquid-crystal cell 2, a transmission type liquid-crystal cell which has liquid crystal 25 enclosed by cell substrates 21 and 28 through a sealing material 24 so that the incident light from a side of arrangement of the optical path changing polarizer 1 is made to exit as display light from the other side through control of the liquid crystal, or the like. The liquid-crystal cell is not particularly limited in kind.

Incidentally, specific examples of the liquid-crystal cell include a TN liquid-crystal cell, an STN liquid-crystal cell, an IPS liquid-crystal cell, an HAN cell, a twisted or non-twisted cell such as an OCB cell, a VA liquid-crystal cell, a guest-host liquid-crystal cell, a ferroelectric liquid-crystal cell, a liquid-crystal cell of the light diffusion type, etc. Further, a suitable drive method such as an active matrix method or a passive matrix method may be used as the method for driving liquid crystal. As illustrated in FIGS. 7 and 8, the liquid crystal is generally driven through transparent electrodes 22 and 27 provided on the inner surface of the pair of cell substrates 21 and 28.

A suitable transparent substrate such as a glass substrate or a resin substrate can be used as each of the cell substrates. Especially, a transparent substrate made of an optically isotropic material is preferably used from the point of view of display quality, etc. A substrate such as a non-alkali glass plate exhibiting excellent colorlessness and transparency with respect to a blue glass plate is preferably used from the point of view of improvement of luminance and display quality, etc. A resin substrate is preferably used from the point of view of reduction in weight, etc. The thickness of the cell substrate can be determined suitably in accordance with enclosing strength of liquid crystal, or the like, without any particular limitation. The thickness of the cell substrate is generally selected to be in a range of from 10 $\mu$m to 5 mm, especially in a range of from 50 $\mu$m to 2 mm, more especially in a range of from 100 $\mu$m to 1 mm, from the point of view of balance between light transmission efficiency and reduction in thickness and weight.

When the liquid-crystal cell is formed, one suitable functional layer, or, two or more suitable functional layers may be provided as occasion demands. Examples of such a suitable functional layer include an aligned film made of a rubbed film for aligning the liquid crystal, a color filter for color display, and so on. Incidentally, aligned films 23 and 26 are generally formed on transparent electrodes 22 and 27 respectively as shown in FIGS. 7 and 8. A color filter not shown is generally provided between one of the cell substrates 21 and 28 and corresponding one of the transparent electrodes.

When the liquid-crystal display device is formed, one suitable optical layer, or, two or more suitable optical layers such as retarder plates 31 and 32, a light diffusing layer 33, a polarizer 34 which is disposed on a side of the liquid-crystal a cell 2 opposite to the optical path changing polarizer 1, etc. may be added to the liquid-crystal cell 2 as occasion demands, as illustrated in FIGS. 7 and 8. The polarizer is provided for achievement of display by using linearly polarized light. The retarder plates are provided for improvement of display quality by compensation for phase difference due to birefringence of liquid crystal, etc. The light diffusing layer is provided for the following purposes: enlargement of a display range by diffusion of display light, uniformity of luminance by leveling of emission-line-like light emission through optical path changing slopes, increase of the quantity of light entering the optical path changing polarizer by diffusion of transmission light in the liquid-crystal cell, etc.

The polarizer disposed on the visual side liquid-crystal cell may be subjected to non-glare treatment or anti-reflection treatment for preventing viewing from being disturbed by surface reflection of external light. Non-glare treatment can be made to form a surface of the polarizer as a fine prismatic structure. In the non-glare treatment, various methods may be used for forming a surface of the polarizer as a fine prismatic structure. Examples of the methods include: a surface roughening method such as a sandblasting method, an embossing method, etc.; a method of mixing transparent particles such as silica particles; and so on. Anti-reflection treatment can be made by a method of forming a coherent vapor deposition film, or the like. Alternatively, non-glare treatment or anti-reflection treatment can be made by a method of bonding a film having a surface structure of fine prismatic structures or an interference film. Incidentally, two polarizers may be provided on opposite sides of the liquid-crystal cells respectively, as shown in the FIGS. 7 and 8. In this case, the optical path changing polarizer according to the present invention is provided on only one side of the liquid-crystal cell so that the surface of the optical path changing polarizer on which the optical path changing means are formed is positioned outside.

On the other hand, each of the retarder plates may be formed of a suitable material. Examples of the material include a birefringence film obtained by drawing a polarizer of a suitable polymer as illustrated in the description of the transparent protective layer by a suitable method such as monoaxial drawing or biaxial drawing, an aligned film of a suitable liquid-crystal polymer such as a nematic liquid-crystal polymer or a discotic liquid-crystal polymer, and an aligned layer of the aligned film supported by a transparent base material. A material having a refractive index controlled in a direction of thickness under the operation of heat shrinkage force of a heat-shrinkable film may be also used.

The compensatory retarder plates 31 and 32 shown in FIGS. 7 and 8 are generally disposed between the back side polarizer P and the liquid-crystal cell 21 and between the visual side polarizer 34 and the liquid-crystal cell 28, respectively, as occasion demands. A suitable material can be used as each of the retarder plates corresponding to the wavelength range, etc. Each of the retarder plates may be formed of a laminate of two or more layers in order to control optical characteristic such as phase difference, etc.

A coating layer, a diffusing sheet, or the like, having a surface structure of fine prismatic structures similarly to that of the non-glare layer can be used to form the light diffusing layer by a suitable method. The light diffusing layer may be disposed as an adhesive layer 33 prepared in the same manner as the transparent particles-containing adhesive layer 15. In this case, the light diffusing layer can serve also as an adhesive layer 33 for bonding the polarizer 34 and the retarder plate 32 to each other, as shown in FIGS. 7 and 8. Hence, reduction in thickness can be achieved. Although the light diffusing layer can be disposed on the outer side (visual side) of the polarizer, arrangement of the light diffusing layer on the liquid-crystal cell 28 side as shown in FIGS. 7 and 8 is more favorable than arrangement of the light diffusing layer on the polarizer 34 side. This is because external light is made incident on the light diffusing layer after absorption by the polarizer so that reflection loss caused by backward scattering through the light diffusing layer can be suppressed.

On the other hand, the illuminator disposed on one of side surfaces of the liquid-crystal cell is provided so that light to be utilized as light for illuminating the liquid-crystal display device is made to incident on the side surface of the liquid-crystal cell. Hence, reduction in thickness and weight of the liquid-crystal display device can be achieved when the illuminator is used in combination with the optical path changing polarizer disposed on the back or front side of the liquid-crystal cell. A suitable illuminator can be used as the illuminator. Examples of the illuminator preferably used include a linear light source such as a (cold or hot) cathode tube, a point light source such as a light-emitting diode, an array of point light sources arranged in line or plane, and a combination of a point light source and a linear light pipe for converting the incident light from the point light source into light of a linear light source through the linear light pipe.

One illuminator 5 may be disposed on one of side surfaces of the liquid-crystal cell 2 as shown in FIG. 7, or illuminators 5 and 51 may be disposed on two or more side surfaces of the liquid-crystal cell 2 as shown in FIG. 8. When illuminators are disposed on a plurality of side surfaces, the plurality of side surfaces may be provided as a combination of side surfaces opposite to each other as shown in FIG. 8, or may be provided as a combination of side surfaces crossing each other. Further, the plurality of side surfaces may be provided as a combination of three or more side surfaces by use of the aforementioned combinations together.

The illuminator makes it possible to view the liquid-crystal display device in a transmission mode in which the illuminator is switched on. When the liquid-crystal display device is provided as a reflection-transmission double type liquid-crystal display device, the illuminator can be switched on/off because the illuminator is not necessary to be switched on when the display device is viewed in a reflection mode by using external light. Any suitable method can be used for switching on/off the illuminator. Any one of background-art methods may be used. Incidentally, the illuminator may be of a multicolor light emission type in which the color of emitted light can be changed. Or different types of illuminators may be provided so that multicolor light emission can be made through the different types of illuminators.

As shown in FIGS. 7 and 8, each of the illuminators 5 and 51 may be used in combination with a suitable assisting means such as a reflector 52. The reflector 52 is provided for enclosing the illuminator to lead scattered light to side surfaces of the liquid-crystal cell 2 as occasion demands. A suitable reflection sheet such as a resin sheet provided with a high-reflectance metal thin film, a white sheet, a sheet of metal foil, etc. may be used as the reflector. The reflector may be used also as a fixing means for enclosing the illuminator by a method of bonding end portions of the reflector to end portions of the cell substrates of the liquid-crystal cell correspondingly.

In the present invention, optical devices or parts such as a liquid-crystal cell, a polarizer, a retarder plate, etc. for forming the liquid-crystal display device may be wholly or partially integrally laminated/fixed onto one another or may be disposed separately. From the point of view of prevention of lowering of contrast by suppression of interface reflection, etc., it is preferable that such optical devices or parts are fixed onto one another. A suitable transparent adhesive agent such as a tackiness agent can be used for the close fixing process. The transparent adhesive layer may contain transparent particles, etc., as described above so that the transparent adhesive layer can exhibit a diffusing function.

The optical devices or parts, especially visual side optical devices or parts, may be formed to have ultraviolet-ray absorbing power by a method of treatment with an ultraviolet-ray absorbent such as a salicylic ester compound, a benzophenone compound, a benzotriazole compound, a cyanoacrylate compound, a nickel complex salt compound, etc.

EXAMPLE 1

An acrylic ultraviolet-curable resin (ARONIX UV-3701 made by TOAGOSEI Co., Ltd.) was dropped by a dropper so that a mold processed into a predetermined shape in advance was filled with the acrylic ultraviolet-curable resin. A triacetylcellulose (TAC) film (having a saponified surface) 80 $\mu$m thick was quietly set on the acrylic ultraviolet-curable resin and then brought in close contact with the acrylic ultraviolet-curable resin by a rubber roller so that a surplus of the resin and air bubbles were removed. Then, the acrylic ultraviolet-curable resin containing the TAC film was irradiated with ultraviolet rays by a metal halide lamp so that the resin was hardened. Then, the hardened resin was stripped off from the mold and cut into a predetermined size. Thus, a transparent protective film was obtained on the TAC film having a refractive index of 1.49. The transparent protective film had an optical path changing means layer with a refractive index of 1.52.

Then, the transparent protective film was bonded to a surface of a polyvinyl alcohol polarizing film (refractive index: 1.5) by a polyvinyl alcohol adhesive agent so that the optical path changing means layer was positioned as an outer surface and so that the ridgelines of the optical path changing means layer were inclined at a predetermined angle. Another TAC film 80 $\mu$m thick was bonded to the other surface of the polarizing film in the same manner as described above. An acrylic adhesive layer containing phenoxyethyl acrylate and having a refractive index of 1.51 was attached to the surface of the TAC film on which no optical path changing means was formed. The adhesive layer was covered with a strip sheet. Thus, an optical path changing polarizer was obtained.

The optical path changing polarizer was 60 mm wide and 45 mm deep. The optical path changing polarizer had prism-like concave portions which were disposed continuously at intervals of a pitch of 210 $\mu$m and which formed ridgelines continued and parallel to one another in the widthwise direction (FIG. 1C). Each of the prism-like concave portions had an optical path changing slope A1, and a gentle slope A3. The inclination angle of each of the optical path changing slopes A1 was 42 degrees. The inclination angle of each of the gentle slopes A3 varied in a range of from 1.8 to 3.5 degrees. The difference between the inclination angles of adjacent ones of the gentle slopes A3 was not larger than 0.1 degrees. The projected width of each of the optical path changing slopes A1 on the polarizer plane was in a range of from 10 to 16 $\mu$m. The ratio of the projected area of the gentle slopes on the polarizer plane to the projected area of the optical path changing slopes on the polarizer plane was not smaller than 12.

Then, the optical path changing polarizer was bonded to the back side (opposite to the visual side) of a TN liquid-crystal cell, which was already available on the market, through the adhesive layer. A cold-cathode tube was disposed on one of side surfaces of the cell. The cold-cathode tube was enclosed by a reflector made of a silver-vapor-deposited reflection sheet. Opposite end portions of the reflector were bonded to upper and lower surfaces of the cell so that the cold-cathode tube was fixed. Then, an ordinary polarizer was bonded to the visual side of the cell. Thus, a normally white transmission type TN liquid-crystal panel was obtained. A reflector made of a white polyester film was disposed on the back side of the panel. Thus, a reflection-transmission double type liquid-crystal display device was obtained. Incidentally, the optical path changing polarizer was disposed so that the optical path changing slopes are parallel to and face the cold-cathode tube.

EXAMPLE 2

An optical path changing means layer was formed in the manner similar to that in Example 1 except that the TAC film was replaced by a polycarbonate (PC) film 75 μm thick. Then, the optical path changing means layer was stripped off from the PC film. Thus, an optical path changing film was obtained. TAC films 80 μm thick were bonded to both surfaces of a polyvinyl alcohol polarizing film through a polyvinyl alcohol adhesive agent to thereby form a polarizer. The optical path changing film was bonded to one surface of the polarizer through an acrylic adhesive layer having a refractive index of 1.51 so that the optical path changing means layer was positioned outside. An acrylic adhesive layer having a refractive index of 1.51 was attached to the other surface of the polarizer. The polarizer was covered with a strip sheet. Thus, an optical path changing polarizer was obtained. Then, a reflection-transmission double type liquid-crystal display device was obtained in the manner similar to that in Example 1 except that the optical path changing polarizer obtained thus in Example 2 was used.

EXAMPLE 3

A different mold was used to obtain an optical path changing film having a plurality of optical path changing means (FIG. 1B). The plurality of optical path changing means had prism-like concave portions disposed at intervals of a pitch of 210 μm. Each of the prism-like concave portions had an optical path changing slope A1, and a steep slope A2. The inclination angle of each of the optical path changing slopes A1 was about 42 degrees. The projected width of each of the optical path changing slopes A1 on a plane of the polarizer was in a range of from 10 to 16 μm. A vertex angle between the optical path changing slope A1 and the steep slope A2 was about 70 degrees. The optical path changing means further had flat surfaces A4. The projected area of the flat surfaces A4 on the polarizer plane was not smaller than 10 times as large as the total projected area of the optical path changing slopes A1 and the steep slopes A2 on the polarizer plane. An optical path changing polarizer and a reflection-transmission double type liquid-crystal display device were obtained in the manner similar to that in Example 2 except that the optical path changing film obtained thus in Example 3 was used.

EXAMPLE 4

A different mold was used to obtain an optical path changing film (FIG. 6) having a plurality of optical path changing means (FIG. 1B). Each of the optical path changing means had a length of 80 μm and was constituted by a combination of an optical path changing slope A1, and a steep slope A2. The inclination angle of each of the optical path changing slopes A1 with respect to the polarizer plane was about 42 degrees. The projected width of each of the optical path changing slopes A1 on the polarizer plane was 10 μm. The inclination angle of each of the steep slopes A2 was about 55 degrees. The optical path changing means were disposed so that the length of each of the optical path changing means was approximately parallel to one another in the widthwise direction and so that the density of the optical path changing means became gradually higher as the location went farther from the light incidence side surface in the widthwise direction. An optical path changing polarizer and a reflection-transmission double type liquid-crystal display device were obtained in the manner similar to that in Example 2 except that the optical path changing film obtained thus in Example 4 was used. Incidentally, the area of the flat surfaces A4 was not smaller than 10 times as large as the total projected area of the optical path changing slopes A1 and the steep slopes A2 on the polarizer plane.

EXAMPLE 5

An optical path changing polarizer and a reflection-transmission double type liquid-crystal display device were obtained in the manner similar to that in Example 2 except that a material having a refractive index of 1.52 was used as each of the surface and second adhesive layers.

EXAMPLE 6

A different mold was used to obtain an optical path changing film (FIG. 4) having a plurality of optical path changing means (FIG. 1A). Each of the optical path changing means had a length of 80 μm, was shaped like an isosceles triangle, and was constituted by two optical path changing slopes A1. The inclination angle of each of the optical path changing slopes A1 with respect to the polarizer plane was about 42 degrees. The projected width of each of the optical path changing slopes A1 on the polarizer plane was 10 μm. The optical path changing means were disposed at random so that the length of each of the optical path changing means was approximately parallel to one another in the widthwise direction and so that the density of the optical path changing means became gradually higher as the location went from the light incidence side surface toward the center portion in the widthwise direction. An optical path changing polarizer was formed in the manner similar to that in Example 2 except that the optical path changing film obtained thus in Example 6 was used. A reflection-transmission double type liquid-crystal display device was obtained in the manner similar to that in Example 2 except that cold-cathode tubes were disposed on opposite side surfaces of the optical path changing polarizer. Incidentally, the projected area of the flat surfaces A4 on the polarizer plane was not smaller than 10 times as large as the total projected area of the optical path changing slopes A1 on the polarizer plane.

Comparative Example 1

Figure 9:
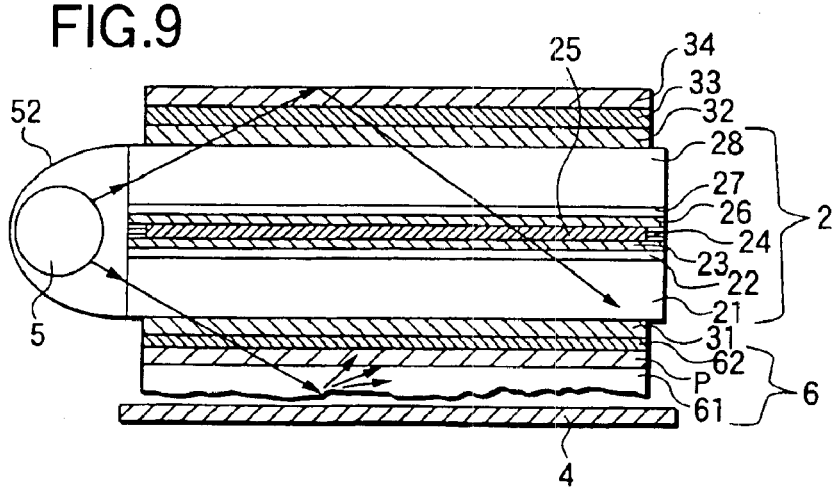
FIG. 9 is an explanatory sectional view showing an example of a background-art transmission type liquid-crystal display device.

An optical path scatter type polarizer and a reflection-transmission double type liquid-crystal display device (FIG. 9) were obtained in the manner similar to that in Example 2 except that the optical path changing film was replaced by a scattering sheet having a surface roughened by sandblasting. Incidentally, the scattering sheet was disposed so that the roughened surface was positioned on the back side (opposite to the visual side) of the display device.

Comparative Example 2

An optical path changing polarizer and a reflection-transmission double type liquid-crystal display device were obtained in the manner similar to that in Example 2 except that a material having a refractive index of 1.46 was used as each of the surface and second adhesive layers.

Comparative Example 3

An optical path changing polarizer and a reflection-transmission double type liquid-crystal display device were obtained in the manner similar to that in Example 2 except that a material having a refractive index of 1.48 was used as each of the surface and second adhesive layers.

Comparative Example 4

A different mold was used to obtain an optical path changing film having a plurality of optical path changing means (FIG. 1B). The plurality of optical path changing means had prism-like concave portions disposed at intervals of a pitch of 210 μm. Each of the prism-like concave portions had an optical path changing slope A1, and a steep slope A2. The inclination angle of each of the optical path changing slopes A1 was about 30 degrees. The projected width of each of the optical path changing slopes A1 on a plane of the polarizer was in a range of from 10 to 16 μm. A vertex angle between the optical path changing slope A1 and the steep slope A2 was about 70 degrees. The optical path changing film further had flat surfaces A4. The projected area of the flat surfaces A4 on the polarizer plane was not smaller than 10 times as large as the total projected area of the optical path changing slopes A1 and the steep slopes A2 on the polarizer plane. An optical path changing polarizer and a reflection-transmission double type liquid-crystal display device were obtained in the manner similar to that in Example 2 except that the optical path changing film obtained thus in Example 3 was used.

Comparative Example 5

An optical path changing polarizer and a reflection-transmission double type liquid-crystal display device were obtained in the manner similar to that in Example 6 except that a material having a refractive index of 1.46 was used as each of the surface and second adhesive layers.

Evaluation Test 1

Frontal luminance in the incidence end portion, center portion and counter end portion of the reflection-transmission double type liquid-crystal display device which was obtained in each of Examples 1 to 6 and Comparative Examples 1 to 5 was measured in a transmission mode by a luminance meter (BM-7 made by TOPCON Corp.) while the cold-cathode tube (tubes) was switched on in the condition that the liquid-crystal cell was supplied with no voltage. Incidentally, in Example 6 and Comparative Example 5, the terminology "incidence end portion" means a side of the display device on which the cold-cathode tube was disposed and the terminology "counter end portion" means the other side of the display device.

Results of the measurement were shown in the following Table 1.

TABLE 1

| | Frontal Luminance (cd/m²) | | |
| --- | --- | --- | --- |
| | Incidence End Portion | Center Portion | Counter End Portion |
| Example 1 | 28 | 30 | 32 |
| Example 2 | 27 | 29 | 29 |
| Example 3 | 25 | 26 | 28 |
| Example 4 | 27 | 27 | 27 |
| Example 5 | 24 | 27 | 26 |
| Example 6 | 53 | 58 | 50 |
| Comparative Example 1 | 6 | 5 | 5 |
| Comparative Example 2 | 26 | 20 | 13 |

TABLE 1-continued

| | Frontal Luminance (cd/m²) | | |
| --- | --- | --- | --- |
| | Incidence End Portion | Center Portion | Counter End Portion |
| Comparative Example 3 | 28 | 22 | 18 |
| Comparative Example 4 | 21 | 14 | 11 |
| Conparative Example 5 | 55 | 46 | 56 |

It is apparent from the Table 1 that excellent frontal luminance was achieved in a transmission mode in Examples 1 to 6 in comparison with Comparative Examples 1 and 4. This is because light in a transmission mode in Comparative Examples 1 and 4 was made to exit in a direction reverse to the light source and served as exit light hardly contributing to display because of poor frontal luminance. Particularly in Comparative Example 1, exit light ran short in all directions. It is also apparent that approximately uniform luminance distributions in the incidence end portion, center portion and counter end portion were achieved in a transmission mode in Examples 1 to 6. In Comparative Examples 2 and 3, display became dark as the location went farther from the light source. Because there was a large difference between luminance in the incidence portion and luminance in the counter end portion, it was impossible to obtain uniform luminance distributions in Comparative Examples 2 and 3. Particularly in Comparative Example 2, the luminance difference was remarkable.

In comparison between Example 6 and Comparative Example 5 as two-light-source systems, it is apparent that improvement of luminance due to the two-light-source system in Example 6 was remarkable so that approximately uniform luminance distributions in the incidence end portion, center portion and counter end portion were achieved and so that the state of exit light was approximately uniform in Example 6. On the contrary, it is apparent that luminance in the center portion in Comparative Example 5 was low and display as a whole in Comparative Example 5 was darker than that in Example 6. Even in viewing in a condition that the liquid-crystal cell was supplied with a voltage in a transmission mode, good display quality was obtained in Examples 1 to 6 without any problem.

On the other hand, in a reflection mode in which external light by use of ring-like illumination was made to enter the display device at an angle of 15 degrees while the cold-cathode tube (tubes) was switched off, good display without any image disorder, etc., was obtained in Examples 1 to 6 in the condition that the liquid-crystal cell was supplied with a voltage. It is apparent from the above description that bright display is achieved in both transmission and reflection modes in Examples 1 to 6. It is proved from the above description that a transmission type or reflection-transmission double type liquid-crystal display device excellent in display quality can be formed according to the present invention, while increase in volume and weight due to the light pipe is avoided so that reduction in thickness and weight is achieved by use of an optical path changing type polarizer.

EXAMPLE 7

An acrylic ultraviolet-curable resin (ARONIX UV-3701 made by TOAGOSEI Co., Ltd.) was dropped by a dropper so that a mold processed into a predetermined shape in advance was filled with the acrylic ultraviolet-curable resin. A triacetylcellulose (TAC) film (having a saponified surface) 80 μm thick was quietly set on the acrylic ultraviolet-curable resin and then stuck closely to the acrylic ultraviolet-curable resin by a rubber roller so that a surplus of the resin and air bubbles were removed. Then, the acrylic ultraviolet-curable resin including the TAC film was irradiated with ultraviolet rays by a metal halide lamp so that the resin was hardened. Then, the hardened resin was stripped off from the mold and cut into a predetermined size. Thus, a transparent protective film was obtained on the TAC film having the refractive index of 1.49. The transparent protective film had an optical path changing means layer with a refractive index of 1.533.

Then, the transparent protective film was bonded to a side of a polyvinyl alcohol polarizing film by a polyvinyl alcohol adhesive agent so that the optical path changing means layer of the transparent protective film was positioned as an outer surface and so that the ridgelines of the optical path changing means layer were inclined at a predetermined angle. Another TAC film 80 μm thick was bonded to the other side of the polarizing film in the same manner as described above. An acrylic adhesive layer having a refractive index of 1.47 was attached to the surface of the TAC film on which no optical path changing means were formed. The adhesive layer was covered with a strip sheet. Thus, an optical path changing polarizer was obtained. The optical path changing polarizer was 60 mm wide and 45 mm deep. The optical path changing polarizer had prism-like concave portions which were disposed continuously at intervals of a pitch of 210 μm and which formed ridgelines continued and parallel to one another in the widthwise direction (FIG. 1C). Each of the prism-like concave portions had an optical path changing slope A1 and a gentle slope A3. The inclination angle of each of the optical path changing slopes A1 was in a range of from 42.5 to 43 degrees. The inclination angle of each of the gentle slopes A3 varied in a range of from 1.8 to 3.5 degrees. The difference between the inclination angles of adjacent ones of the gentle slopes A3 was not larger than 0.1 degrees. The projected width of each of the optical path changing slopes A1 on the polarizer plane was in a range of from 10 to 16 μm. The ratio of the projected area of the gentle slopes A3 on the polarizer plane to the projected area of the optical path changing slopes A1 on the polarizer plane was not smaller than 12.

Then, the optical path changing polarizer was bonded to the back side (opposite to the visual side) of a TN liquid-crystal cell, which was already available on the market, through the adhesive layer. A cold-cathode tube was disposed on one of side surfaces of the cell. The cold-cathode tube was enclosed by a reflector made of a silver-vapor-deposited reflection sheet. Opposite end portions of the reflector were bonded to upper and lower surfaces of the cell so that the cold-cathode tube was fixed. Then, a light diffusing film which was constituted by a further TAC film and a resin particle-containing adhesive layer formed on the TAC film was bonded to the visual side of the cell. Thus, a normally white transmission type TN liquid-crystal panel was obtained. A reflector made of a white polyester film was disposed on the back side of the panel. Thus, a transmission type liquid-crystal display device was obtained. Incidentally, the optical path changing polarizer was disposed so that the optical path changing slopes are parallel to and face the cold-cathode tube.

EXAMPLE 8

A transmission type liquid-crystal display device was obtained in the manner similar to that in Example 7 except that the optical path changing polarizer was replaced by an optical path changing polarizer having a plurality of optical path changing means (FIG. 1B) each of which had an optical path changing slope A1, a steep slope A2 and a flat surface A4. The optical path changing slope A1 was inclined at an inclination angle of about 42 degrees with respect to the polarizer plane, the steep slope A2 was made a vertical angle of 70 degrees with respect to the optical path changing slope A1, and the flat surface A4 had a projected area, on the polarizer plane, of not smaller than 10 times as large as the total projected area of the optical path changing slope A1 and the steep slope A2 on the polarizer plane.

EXAMPLE 9

A transmission type liquid-crystal display device was obtained in the manner similar to that in Example 7 except that the optical path changing polarizer was replaced by an optical path changing polarizer (FIG. 6) which had a plurality of optical path changing means (FIG. 1B). Each of the plurality of optical path changing means had a length of 80 μm and was constituted by an optical path changing slope A1 and a steep slope A2. The optical path changing slope A1 was inclined at an inclination angle of about 42 degrees with respect to the polarizer plane and had a projected width of 10 μm on the polarizer plane. The steep slope A2 was inclined at an inclination angle of about 55 degrees with respect to the polarizer plane. The lengths of the plurality of optical path changing means were substantially parallel to one another in the widthwise direction, and the optical path changing means were disposed with a gradually higher density as the location went farther from the incidence side surface, on which the light was incident, in the widthwise direction. Incidentally, the projected area, on the polarizer plane, of the flat surfaces A4 was not smaller than 10 times as large as the total projected area, on the polarizer plane, of the optical path changing slopes A1 and the steep slopes A2.

EXAMPLE 10

A transmission type liquid-crystal display device was obtained in the manner similar to that in Example 7 except that the optical path changing polarizer was replaced by an optical path changing polarizer (FIG. 4) which had a plurality of optical path changing means (FIG. 1A). Each of the plurality of optical path changing means had a length of 80 μm and was shaped like an isosceles triangle by two optical path changing slopes A1. Each of the optical path changing slopes A1 was inclined at an inclination angle of about 42 degrees with respect to the polarizer plane and had a projected width of 10 μm on the polarizer plane. The lengths of the plurality of optical path changing means were parallel to one another in the widthwise direction and the optical path changing means were disposed at random so that the density of the optical path changing means were gradually higher as the location went from the incidence side surface, on which the light is incident, to the center portion, in the widthwise direction. Cold-cathode tubes were disposed on two opposite side surfaces of the optical path changing polarizer obtained thus. Incidentally, the projected area, on the polarizer plane, of the flat surfaces A4 was not smaller than 10 times as large as the projected area, on the polarizer plane, of the optical path changing slopes A1.

EXAMPLE 11

A transmission type liquid-crystal display device using two cold-cathode tubes deposed on opposite incidence side surfaces was obtained in the manner similar to that in Example 10 except that the optical path changing polarizer was replaced by an optical path changing polarizer which had a plurality of optical path changing means (FIG. 1E). Each of the plurality of optical path changing means had a length of 80 μm and was substantially shaped like a tetragon including two optical path changing slopes A1. Each of the optical path changing slopes A1 was inclined at an inclination angle of about 42 degrees with respect to the polarizer plane and had a projected width of 10 μm on the polarizer plane. The lengths of the plurality of optical path changing means were substantially parallel to one another in the widthwise direction, and the optical path changing means were disposed at random so that density of the optical path changing means was gradually higher as the location went from the incidence side surface, on which the light was incident, to the center portion in the widthwise direction. Incidentally, the projected area of the flat surfaces A4 on the polarizer plane was not smaller than 10 times as large as the projected area of the plurality of optical path changing means A1 on the polarizer plane.

EXAMPLE 12

A reflection-transmission double type liquid-crystal display device was obtained in the manner similar to that in Example 8 except that the optical path changing polarizer was replaced by an optical path changing polarizer having a reflection layer of a silver-vapor-deposited film disposed on the surface on which the optical path changing means were formed and except that the reflector provided on the back side was omitted.

Comparative Example 6

A transmission type liquid-crystal display device (FIG. 9) was obtained in the manner similar to that in Example 7 except that the optical path changing polarizer was replaced by a scattering sheet formed by a sandblasting process. Incidentally, the scattering sheet was disposed so that the roughened surface of the scattering sheet was positioned on the back side (opposite to the visual side).

Comparative Example 7

A transmission type liquid-crystal display device was obtained in the manner similar to that in Example 7 except that the optical path changing polarizer was replaced by an optical path changing polarizer having a plurality of optical path changing means (FIG. 1B). Each of the plurality of optical path changing means had an optical path changing slope A1 and a steep slope A2. The optical path changing slope A1 was inclined at an inclination angle of about 30 degrees with respect to the polarizer plane, and the steep slope A2 was made a vertex angle of 70 degrees with respect to the optical path changing slope A1. In the optical path changing polarizer, each of flat portions A4 had a projected area, on the polarizer plane, of not smaller than 10 times as large as the total projected area, on the polarizer plane, of the optical path changing slope A1 and the steep slope A2.

Comparative Example 8

A cold-cathode tube was disposed on one of side surfaces of a 1.2 mm-thick light pipe having an embossed roughened surface on the back side (opposite to the visual side). The cold-cathode tube was enclosed by a reflector made of a silver-vapor-deposited reflection sheet. Opposite end portions of the reflector were bonded to upper and lower surfaces of the light pipe. The light pipe was then disposed on a reflection sheet made of a white polyester film. A normally white transmission type TN liquid-crystal panel which was already available on the market was disposed on the light pipe through a light diffusing plate. Thus, a transmission type liquid-crystal display device was obtained.

Comparative Example 9

A reflection-transmission double type liquid-crystal display device was obtained in the manner similar to that in Example 12 except that the optical path polarizer was replaced by a scattering sheet which was prepared in the similar manner to that in Comparative Example 6 and which had a scattering surface provided with a reflection layer of a silver-vapor-deposited film and except that the reflector provided on the back side was omitted.

Comparative Example 10

A reflection-transmission double type liquid-crystal display device was obtained in the manner similar to that in Example 12 except that the optical path changing polarizer was replaced by an optical path changing polarizer which was prepared in the similar manner to that in Comparative Example 7, and which had a reflection layer of a silver-vapor-deposited film disposed on the surface on which the optical path changing means were formed and except that the reflector provided on the back side was omitted.

Evaluation Test 2

Frontal luminance in the center portion of the transmission type or reflection-transmission double type liquid-crystal display device obtained in each of Examples 7 to 12 and Comparative Examples 6 to 10 was measured in a transmission mode by a luminance meter (BM-7 made by TOPCON Corp.) while the cold-cathode tube (tubes) was switched on in the condition that the liquid-crystal cell was supplied with no voltage. Frontal alluminance in a white state was also measured in the aforementioned manner in a reflection mode in which external light by using ring-like illumination was made incident at an angle of 15 degrees while the cold-cathode tube (tubes) was switched off.

Results of the measurement were shown in the following Table 2.

TABLE 2

| | Frontal Luminance (cd/m$^2$) | |
| --- | --- | --- |
| | Transmission Mode | Reflection Mode |
| Example 7 | 22 | — |
| Example 8 | 23 | — |
| Example 9 | 24 | — |
| Example 10 | 37 | — |
| Example 11 | 39 | — |
| Example 12 | 22 | 474 |
| Comparative Example 6 | 4 | — |
| Comparative Example 7 | 9 | — |
| Comparative Example 8 | 36 | — |
| Comparative Example 9 | 3 | 399 |
| Comparative Example 10 | 10 | 431 |

It is apparent from the Table 2 that excellent frontal luminance was achieved in Examples 7 to 12 in comparison with Comparative Examples 6, 7, 9 and 10. This is because light in Comparative Examples 6, 7, 9 and 10 was made to exit in a direction reverse to the light source and served as the exit light hardly contributing to display because of poor frontal luminance. Particularly in Comparative Examples 6 and 9, exit light ran short in all directions.

On the other hand, in Examples 10 and 11, improvement of luminance by the two light sources was remarkable. It is apparent that more brightness than that in the side-lighting type light pipe in Comparative Example 8 was obtained in Examples 10 and 11. Incidentally, in the display device using the side-lighting type light pipe in Comparative Example 3, increase of thickness due to the light pipe was remarkable, so that it was difficult to reduce the thickness of the display device. In Examples 7 to 12, good display quality was obtained because there was no problem on visibility in the transmission mode in the condition that a voltage was applied to the liquid-crystal cell. The result of Example 8 in which the light diffusing film was removed was inferior invisibility but almost equivalent in frontal luminance to the case where the light diffusing film was provided.

On the other hand, in a reflection mode, good display without any image disorder, etc., was obtained in Example 12 and Comparative Examples 9 and 10 in the condition that the liquid-crystal cell was supplied with a voltage. Display in Comparative Examples 9 and 10 was, however, darker than that in Example 12. It is proved from the above description that bright display in a transmission mode can be achieved in Examples 6 to 12 and bright display in a reflection mode can be also achieved in Example 12. Accordingly, a transmission type or reflection-transmission double type liquid-crystal display device excellent in display quality can be formed according to the present invention while increase in volume and weight due to the light pipe is avoided so that reduction in thickness and weight of the display device is achieved by use of an optical path changing type polarizer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical path changing polarizer comprising:
   an absorption-type polarizer;
   a adhesive layer disposed on one side of said polarizer, said adhesive layer having a refractive index different by 0.1 or less from a refractive index of a surface layer of said one side of said polarizer; and
   a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer.

2. An optical path changing polarizer according to claim 1, wherein an inclination angle of each of said optical path changing slopes with respect to said polarizer plane is in a range of from 38 to 45 degrees.

3. An optical path changing polarizer according to claim 1, wherein said optical path changing slopes are formed into a structure of grooves each substantially triangular shaped.

4. An optical path changing polarizer according to claim 1, wherein said optical path changing slopes are formed into a structure of grooves or protrusions each having one of a substantially tetragon shape or a pentagon shape in section.

5. An optical path changing polarizer comprising:
   a polarizer;
   a adhesive layer disposed on one side of said polarizer, said adhesive layer having a refractive index different by 0.1 or less from a refractive index of a surface layer of said one side of said polarizer; and
   a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said optical path changing slopes consist of one kind of slopes aligned in a substantially constant direction, or include two or more kinds of slopes in which one kind of slopes aligned in a substantially constant direction serve as a reference while another kind of slopes aligned in another substantially constant direction are opposite to said one kind of slopes, and wherein said adhesive layer is covered with a strip sheet.

6. An optical path changing polarizer comprising:
   a polarizer;
   a adhesive layer disposed on one side of said polarizer, said adhesive layer having a refractive index different by 0.1 or less from a refractive index of a surface layer of said one side of said polarizer; and
   a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein flat surfaces each of which is inclined at an inclination angle of not larger than 5 degrees with respect to said polarization plate plane has a projected area, on said polarizer plane, not smaller than 10 times as large as a projected area, on said polarizer plane, of slopes each of which is inclined at an inclination angle of not smaller than 35 degrees with respect to said polarizer plane.

7. An optical path changing polarizer comprising:
   a polarizer;
   a adhesive layer disposed on one side of said polarizer, said adhesive layer having a refractive index different by 0.1 or less from a refractive index of a surface layer of said one side of said polarizer; and
   a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said prismatic structure is constituted by a combination of said optical path changing slopes and flat surfaces, wherein each of said optical path changing slopes is inclined at an inclination angle in a range of from 38 to 45 degrees with respect to said polarizer plane, wherein each of said flat surfaces is inclined at an inclination angle of not larger than 5 degrees with respect to said polarizer plane and has a width of not smaller than 10 times as large as the width of each of said optical path changing slopes, and wherein said structure is formed by grooves each of which is substantially shaped like a triangle in section and which are continued from one end to the other end of said polarizer.

8. An optical path changing polarizer comprising:
   a polarizer;
   a adhesive layer disposed on one side of said polarizer, said adhesive layer having a refractive index different by 0.1 or less from a refractive index of a surface layer of said one side of said polarizer; and
   a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said prismatic structure is constituted by discontinuous grooves each substantially shaped like a polygon such as a triangle, a tetragon or a pentagon in section, wherein the length of each of said discontinuous grooves is not smaller than 5 times as large as the depth of each of said discontinuous grooves, wherein said optical path changing slopes are formed in a direction of the length of said grooves and inclined at an inclination angle in a range of from 38 to 45 degrees with respect to said polarizer plane, and wherein a projected area, on said polarizer plane, of said discontinuous grooves is not larger than 10% of said polarizer plane.

9. An optical path changing polarizer comprising:

a polarizer;

a adhesive layer disposed on one side of said polarizer, said adhesive layer having a refractive index different by 0.1 or less from a refractive index of a surface layer of said one side of said polarizer; and a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said prismatic structure is formed so as to be added to or integrated with a transparent protective layer of said polarizer.

10. An optical path changing polarizer comprising:

a polarizer;

a adhesive layer disposed on one side of said polarizer, said adhesive layer having a refractive index different by 0.1 or less from a refractive index of a surface layer of said one side of said polarizer; and a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, further comprising a reflection layer disposed closely on a surface on which said prismatic structure is formed.

11. An optical path changing polarizer comprising:

a polarizer;

a adhesive layer disposed on one side of said polarizer, said adhesive layer having a refractive index different by 0.1 or less from a refractive index of a surface layer of said one side of said polarizer; and a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said optical path changing slopes have ridgelines parallel to or inclined within an angle range of ±30 degrees with respect to one side of said polarizer.

12. An optical path changing polarizer comprising:

a polarizer;

a adhesive layer disposed on one side of said polarizer, said adhesive layer having a refractive index different by 0.1 or less from a refractive index of a surface layer of said one side of said polarizer; and a repetitive prismatic structure provided on the other side of said polarizer, said repetitive prismatic structure including optical path changing slopes aligned in a substantially constant direction so as to be inclined at an inclination angle in a range of from 35 to 48 degrees with respect to a plane of said polarizer, wherein said adhesive layer is of a light diffusion type.

13. An optical path changing polarizer comprising:

a polarizer including a polarizing element and a transparent protective layer disposed on at least one side of said polarizing element, said polarizer having two side surfaces;

an adhesive layer disposed on one side surface of said polarizer; and a repetitive prismatic structure disposed on the other side of said polarizer, said repetitive prismatic structure including optical path changing slopes aligned in a substantially constant direction so as to be inclined at an inclination angle of from 35 to 48 degrees with respect to a plane of said polarizer;

wherein each of respective refractive indexes of said adhesive layer and a material for forming said optical path changing slopes is not lower than a refractive index of said polarizing element or said transparent protective layer.

14. An optical path changing polarizer according to claim 13, wherein said optical path changing slopes consist of one kind of slopes aligned in a substantially constant direction, or include two or more kinds of slopes in which one kind of slopes aligned in a substantially constant direction serve as a reference while another kind of slopes aligned in another substantially constant direction are opposite to said one kind of slopes.

15. An optical path changing polarizer according to claim 13, wherein said repetitive prismatic structure having said optical path changing slopes is formed on an outer surface of a film, the other surface of said film being bonded to said other side of said polarizer through a second adhesive layer; and wherein a refractive index of said second adhesive layer is not lower than the refractive index of said polarizing element or transparent protective layer.

16. An optical path changing polarizer according to claim 13, wherein at least said adhesive layer disposed on said one side surface of said polarizer is a tacky layer.

17. An optical path changing polarizer according to claim 16, wherein an exposed surface of said tacky layer on said one side surface of said polarizer is covered with a strip sheet.

18. An optical path changing polarizer according to claim 13, wherein each of said optical path changing slopes is inclined at an inclination angle in a range of from 38 to 45 degrees with respect to a plane of said polarizer.

19. An optical path changing polarizer according to claim 13, wherein each of said optical path changing slopes is based on a groove structure having a shape substantially of an isosceles triangle or any other triangle in section.

20. An optical path changing polarizer according to claim 13, wherein each of said optical path changing slopes is based on a groove or protrusion structure having one of a substantially tetragon or a pentagon shape in section.

21. An optical path changing polarizer according to claim 13, wherein a first projected area, on said polarizer plane, of any flat surface having an inclination angle of not larger than 5 degrees with respect to said polarizer plane is not smaller than 10 times as large as a second projected area, on said polarizer plane, of any slope having an inclination angle of not smaller than 35 degrees.

22. An optical path changing polarizer according to claim 13, wherein said structure of irregularities has optical path changing slopes each inclined at an inclination angle in a range of from 38 to 45 degrees with respect to said polarizer plane, and flat surfaces each inclined at an inclination angle of not larger than 5 degrees with respect to said polarizer plane and each having a width not smaller than 10 times as large as a width of each of said optical path changing slopes, and wherein said structure is formed by continuous grooves each of which has substantially a triangular shape in section and each of which is extended from one end to the other end of said polarizer.

23. An optical path changing polarizer according to claim 13, wherein: said structure of irregularities having optical path changing slopes is formed by discontinuous grooves each has substantially a polygon shape in section; a length of each of said discontinuous grooves is not smaller than 5 times as large as a depth of said groove; said optical path changing slopes are formed in a direction of the length of said grooves and inclined at an inclination angle in a range of from 38 to 45 degrees with respect to said polarizer plane; and a ratio of an area of said discontinuous grooves to an area of said one side surface of said polarizer is not higher than 10%.

24. An optical path changing polarizer according to claim 23, wherein said discontinuous grooves having optical path changing slopes are arranged at random.

25. An optical path changing polarizer according to claim 13, wherein said repetitive prismatic structure having optical path changing slopes is formed so as to be integrated with said transparent protective layer of said polarizer.

26. An optical path changing polarizer according to claim 13, wherein a light reflection layer is disposed closely on a surface on which said structure of irregularities having optical path changing slopes is formed.

27. An optical path changing polarizer according to claim 13, wherein ridgelines of said optical path changing slopes are parallel to or inclined within an angle range of 35 degrees with respect to one side of said polarizer.

28. An optical path changing polarizer according to claim 13, wherein said adhesive layer is of a light diffusion type.

29. An optical path changing polarizer according to claim 28, wherein said light diffusion type adhesive layer is provided on a surface of said polarizer.

* * * * *